(12) United States Patent
Gupta et al.

(10) Patent No.: US 11,363,109 B2
(45) Date of Patent: Jun. 14, 2022

(54) AUTONOMOUS INTELLIGENT SYSTEM FOR FEATURE ENHANCEMENT AND IMPROVEMENT PRIORITIZATION

(71) Applicant: Dell Products L. P., Round Rock, TX (US)

(72) Inventors: Shubham Gupta, Jaipur (IN); Rohan Sharma, Delhi (IN); Rangan Basu, Gurgaon (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/827,236

(22) Filed: Mar. 23, 2020

(65) Prior Publication Data

US 2021/0294588 A1 Sep. 23, 2021

(51) Int. Cl.
| | |
|---|---|
| *H04L 67/50* | (2022.01) |
| *G06F 8/65* | (2018.01) |
| *G06F 9/30* | (2018.01) |
| *G06Q 30/02* | (2012.01) |
| *G06F 21/50* | (2013.01) |
| *G06F 16/31* | (2019.01) |
| *G06N 20/00* | (2019.01) |

(52) U.S. Cl.
CPC ............. *H04L 67/22* (2013.01); *G06F 8/65* (2013.01); *G06F 9/30036* (2013.01); *G06F 16/313* (2019.01); *G06F 21/50* (2013.01); *G06Q 30/0282* (2013.01); *G06N 20/00* (2019.01)

(58) Field of Classification Search
CPC ..... G06F 8/65; G06F 8/70; G06F 8/77; G06F 11/3438; H04L 67/22; H04L 67/125; H04L 67/306; G06N 20/00

USPC .......................................................... 717/168
See application file for complete search history.

(56) References Cited

U.S. PATENT DOCUMENTS

| | | | | |
|---|---|---|---|---|
| 8,370,825 | B2* | 2/2013 | Curtis | G06F 8/65 |
| | | | | 717/168 |
| 9,235,390 | B1* | 1/2016 | Satish | G06F 11/3003 |
| 10,379,830 | B2* | 8/2019 | Prasad | G06F 8/61 |
| 2007/0150815 | A1* | 6/2007 | Smith | G06F 9/445 |
| | | | | 715/733 |

(Continued)

OTHER PUBLICATIONS

Marciuska, S., et al., Feature Usage As a Value Indicator for Decision Making, 23rd Australian Software Engineering Conference, Apr. 7-10, 2014, pp. 124-131, [retrieved on Apr. 6, 2021], Retrieved from the Internet: <URL:http://ieeexplore.ieee.org/>.*

(Continued)

*Primary Examiner* — Geoffrey R St Leger
(74) *Attorney, Agent, or Firm* — Krishnendu Gupta; Deepika Bhayana; Derek Lam

(57) ABSTRACT

Systems and methods for prioritizing enhancement and/or improvements of features of a user application are disclosed. In at least one embodiment, a method includes retrieving analytics data generated by an analytics engine, where the analytics data includes data relating to user interactions with a feature of the user application. A plurality of vectors is generated from the analytics data. The plurality of vectors include vectors corresponding to user interactions with the feature. A priority is assigned to enhancing and/or improving the feature of the user application based on a weighted sum of the plurality of vectors.

20 Claims, 11 Drawing Sheets

(56) References Cited

U.S. PATENT DOCUMENTS

| | | | | |
|---|---|---|---|---|
| 2013/0267249 | A1* | 10/2013 | Rosenberg | H04W 4/029 455/456.3 |
| 2017/0140053 | A1* | 5/2017 | Vorobev | G06F 16/9535 |
| 2018/0046637 | A1* | 2/2018 | Koopman | G06F 16/958 |
| 2019/0317885 | A1* | 10/2019 | Heinecke | G06F 11/3409 |
| 2020/0159551 | A1* | 5/2020 | Booth | G06F 9/453 |
| 2020/0249941 | A1* | 8/2020 | Tornhill | G06F 8/77 |
| 2020/0272623 | A1* | 8/2020 | Aggour | G06N 5/02 |

OTHER PUBLICATIONS

Villarroel, L., et al., Release Planning of Mobile Apps Based on User Reviews, IEEE/ACM 38th International Conference on Software Engineering (ICSE), May 14-22, 2016, pp. 14-24, [retrieved on Apr. 6, 2021], Retrieved from the Internet: <URL:http://ieeexplore.ieee.org/>.*

* cited by examiner

AUTONOMOUS INTELLIGENT SYSTEM FOR FEATURE ENHANCEMENT AND IMPROVEMENT PRIORITIZATION

BACKGROUND OF THE INVENTION

Field of the Invention

This invention generally relates to the management of application feature enhancement and improvement and, more particularly to an autonomous system for feature enhancement and improvement prioritization of one or more applications using intelligent analytics.

Description of the Related Art

As the value and use of information continue to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A system of one or more computers can be configured to perform particular operations or actions by virtue of having software, firmware, hardware, or a combination of them installed on the system that in operation causes or cause the system to implement an autonomous intelligent system for feature enhancement and improvement prioritization. At least one embodiment is directed to computer-implemented method for prioritizing enhancement and/or improvements of features of a user application, where the method includes: retrieving analytics data generated by an analytics engine, where the analytics data includes data relating to user interactions with a feature of the user application; generating a plurality of vectors using the analytics data, where the plurality of vectors include vectors corresponding to one or more of: a feature performance vector based on performance metrics of the feature of the user application; a feature engagement vector based on metrics for user engagement with the feature of the user application; a feature visitor vector based on metrics associated with new visitors and/or returning visitors using the feature of the user application; a feature adoption vector based on user adoption of prior features; assigning a weight to each of the plurality of vectors; and assigning a priority to enhancing and/or improving the feature of the user application based on a weighted sum of the plurality of vectors. Other embodiments of this aspect include corresponding computer systems, apparatus, and computer programs recorded on one or more computer storage devices, each configured to perform the actions of the methods.

At least one embodiment is directed to a system including one or more information handling systems, where the one or more information handling systems include: a processor; a data bus coupled to the processor; and a non-transitory, computer-readable storage medium embodying computer program code, the non-transitory, computer-readable storage medium being coupled to the data bus; where the computer program code included in one or more of the information handling systems is executable by the processor of the information handling system so that the information handling system, alone or in combination with other information handling systems, executes operations may include: retrieving analytics data generated by an analytics engine, where the analytics data includes data relating to user interactions with a feature of a user application; generating a plurality of vectors using the analytics data, where the plurality of vectors include vectors corresponding to one or more of: a feature performance vector based on performance metrics of the feature of the user application; a feature engagement vector based on metrics for user engagement with the feature of the user application; a feature visitor vector based on metrics associated with new visitors and/or returning visitors using the feature of the user application; a feature adoption vector based on user adoption of prior features; assigning a weight to each of the plurality of vectors; and assigning a priority to enhancing and/or improving the feature of the user application based on a weighted sum of the plurality of vectors.

At least one embodiment is directed to a non-transitory, computer-readable storage medium embodying computer program code, the computer program code may include computer-executable instructions configured for: retrieving analytics data generated by an analytics engine, where the analytics data includes data relating to user interactions with a feature of the user application; generating a plurality of vectors using the analytics data, where the plurality of vectors include vectors corresponding to one or more of: a feature performance vector based on performance metrics of the feature of the user application; a feature engagement vector based on metrics for user engagement with the feature of the user application; a feature visitor vector based on metrics associated with new visitors and/or returning visitors using the feature of the user application; a feature adoption vector based on user adoption of prior features; assigning a weight to each of the plurality of vectors; and assigning a priority to enhancing and/or improving the feature of the user application based on a weighted sum of the plurality of vectors.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
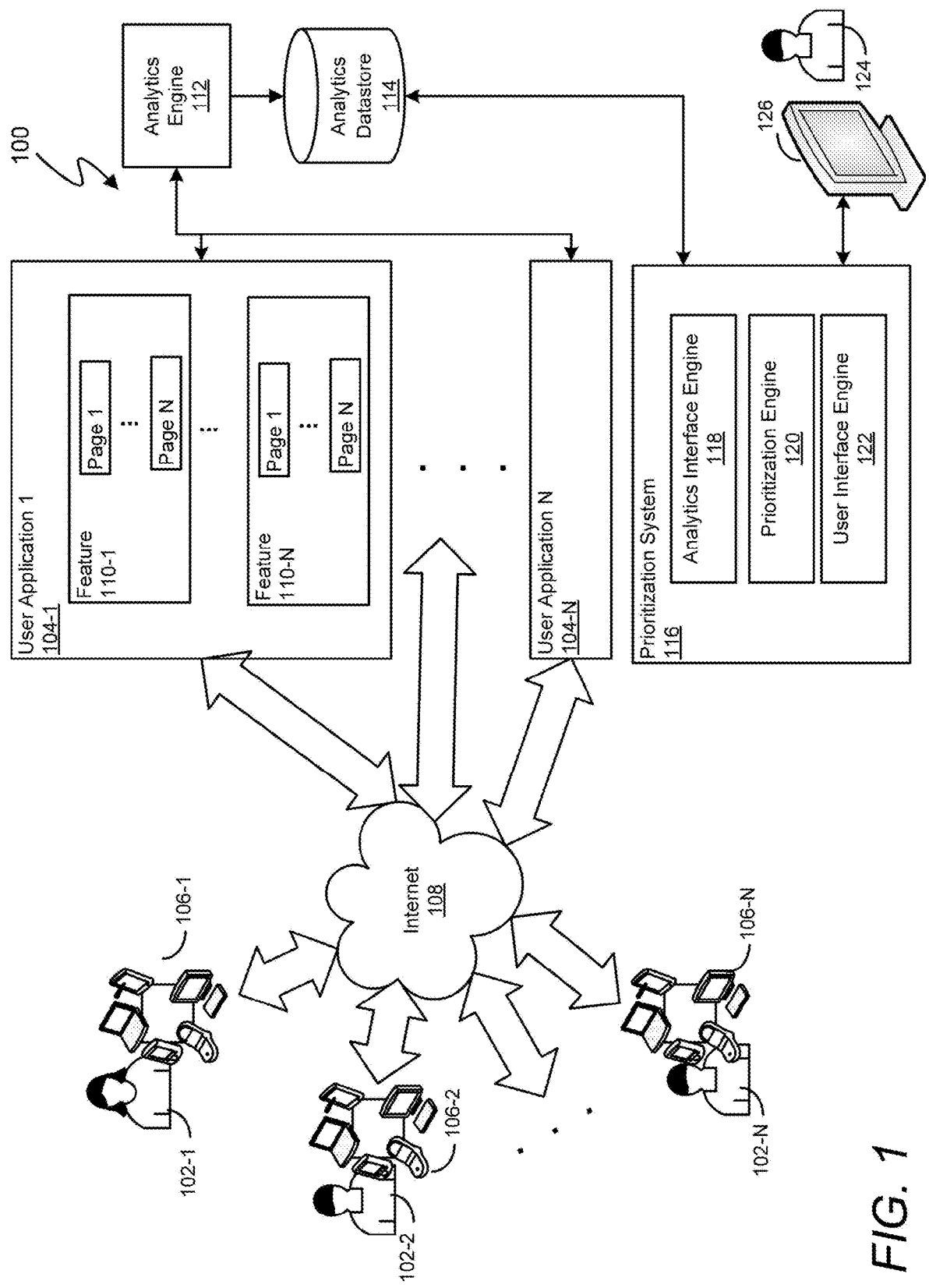
FIG. 1 depicts an electronic environment in which certain embodiments of the disclosed system may operate.

Systems and methods are disclosed that enable Dev Managers, Product Owners, and Project Managers to prioritize feature development based on features having the most user impact. Certain embodiments assess user interaction data and analytics to assist in the identification of features which should receive a high priority for enhancement, improvement and/or update in order to deliver the most value to an enterprise while also identifying features which can be enhanced, improved, and/or updated at a later time. Certain embodiments utilize weighted vectors to determine the features which deliver optimal business value. Certain embodiments also employ machine learning techniques that are used to predict feature adoption based on feature adoption ratings or similar features/sub-features. Certain embodiments also consider the feedback given by users on particular features of the application. Further, certain embodiments consider prioritization inputs provided by owners and developers of the features.

In many organizations, there is a mix of applications that help the organization's workforce to be productive and efficient. Generally stated, many organizations have a mix of two groups of applications. The first group includes primary applications that users in the workforce must have to smoothly execute the user's jobs. The second group includes secondary and/or optional applications that often include apps that are meant to increase productivity.

Examples of applications in the second group may include Enterprise Mobile apps, Custom dashboards, MySales mobile app, which is an aggregator app from multiple desktop platforms (GOSS, Salesforce, Coins, etc.). However, users may abandon such applications if the apps are not helping the user improve their productivity. As such, secondary applications may be abandoned/replaced if users do not find the applications useful enough to help them with their job tasks.

The disclosed system is suitable for prioritizing feature enhancements and updates of applications in both the primary and secondary application groups. However, it will be recognized, based on the teachings of the present disclosure, that the prioritizing feature enhancements/improvements are particularly useful in connection with secondary applications to sustain the user base of the secondary applications.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smartphone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

FIG. 1 depicts an electronic environment 100 in which certain embodiments of the disclosed system may operate. In this example, a plurality of users 102-1 through 102-N (where N is an index corresponding to the number of users) are capable of interacting with one or more of a plurality of user applications 104-1 through 104-N (where N is an index corresponding to the number of user applications) using corresponding user devices 106-1 through 106-N (where N is an index corresponding to the user devices utilized by users 102-1 through 102-N) over a network such as the Internet 108.

The user applications 104-1 through 104-N each have a corresponding set of features. In the example shown in FIG. 1, user application 104-1 includes features 110-1 through 110-N (where N is an index corresponding to the number of features). In certain embodiments, each feature is implemented using one or more pages Page-1 through Page-N (where N is an index corresponding to the number of pages used to implement the respective feature). In certain embodiments, the pages used to implement a feature may be web pages that are accessible to the users 102-1 through 102-N using web browsers in the corresponding user devices 106-1 through 106-N. In certain embodiments, one or more of the pages may include programming, such as a Java program, that implement certain aspects of the feature associated with a page. In certain embodiments, the features constitute the front end of an application base that is integrated with a corresponding backend (not shown).

In certain embodiments, an analytics engine 112 is configured to monitor the performance of the features and/or user interaction with the features of each user application. In certain embodiments, the analytics engine 112 monitors the time taken to open a session for the features, the time for actions taken while executing the features, and the existence and severity of software bugs. In certain embodiments, the analytics engine 112 monitors parameters associated with the engagement between users and features. In certain embodiments, the feature engagement metrics may include the time spent on one or more pages of the feature, the number of activations (e.g., clicks) of the controls on pages of the features, the number of views of pages associated with the features, the bounce rates for the pages of the features, and the number of pages for the features that are opened per session. In certain embodiments, the analytics engine 112 monitors parameters associated with visitors who engage the features. As an example, visitor parameters may include the number of new visitors who access the features and/or the number of visitors returning to access the features.

In certain embodiments, the analytics engine 112 stores the analytics data in an analytics datastore 114. The analytics data may be in the form of unprocessed raw data from which feature performance and user interaction parameters may be calculated. Additionally, or on the alternative, the analytics engine 112 may process raw analytics data and place it in the analytics datastore 114 in a predetermined format for subsequent use as described herein.

The exemplary system shown in FIG. 1 includes a prioritization system 116 that is configured to assign priorities to one or more of the features of one or more of the user applications. The priorities may be used as a baseline to determine the order in which feature enhancements, feature improvements, etc., may be addressed by system developers. By prioritizing features in the manner disclosed herein, developers may identify the most significant features that may be enhanced or otherwise improved to keep users engaged with the application and potentially provide the most significant productivity gains.

In the example shown in FIG. 1, the prioritization system 116 includes an analytics interface engine 118. In certain embodiments, the analytics interface engine 118 is configured to retrieve analytics data from the analytics datastore 114. In certain embodiments, the data retrieved from the analytics datastore 114 by the analytics interface engine 118 may be in the form of raw analytics data that may be used to derive various parameters that may be used in prioritizing feature enhancements and/or improvements. As an example, the raw analytics data in the analytics datastore 114 may include a timestamp for when a session is opened and a further timestamp for when the session is closed. The analytics interface engine 118 in certain embodiments uses this session data to determine the length of a session. As a further example, the raw analytics data in the analytics datastore 114 may include a timestamp corresponding to when a page of a feature is opened and another timestamp corresponding to when the page of the features closed. The analytics interface engine 118 in certain embodiments may use this page data to determine the time that users spend engaging the feature page. Additionally, or in the alternative, the analytics interface engine 118 configured to access analytics data that has already been processed by the analytics engine 112. As an example, the analytics engine 112 may calculate the length of a session and store the length of the session in the analytics datastore 114 for retrieval by the analytics interface engine 118 of the prioritization system 116.

In certain embodiments, analytics information from the analytics interface engine 118 is provided to a prioritization engine 120. The prioritization engine 120 is configured to a priority to enhancing and/or improving the features of the user application. To this end, the prioritization engine 120 generates a plurality of vectors using the analytics information received from the analytics interface engine 118. Various vectors may be derived from the analytics data received from the analytics interface engine 118 pursuant to assigning a priority to enhancing and/or improving the feature of the user application that is being analyzed. In certain embodiments, the vectors include one or more of a feature performance factor based on performance metrics of the feature of the user application as derived from the analytics data, a feature engagement factor based on metrics for user engagement with the feature of the user application as derived from the analytics data, a feature visitor vector based on metrics associated with new visitors and/or returning visitors using the feature of the user application as derived from the analytics data, and a feature adoption vector based on user adoption of prior features similar to the feature that is in the process of being prioritized. In certain embodiments, a weight is assigned to each of the plurality of vectors, and a priority is assigned to the feature of the user application based on a weighted sum of the plurality of vectors. In certain embodiments, the weighted sum of the plurality of vectors is used to generate an index value corresponding to the priority for enhancing and/or improving the feature. In certain embodiments, one or more of the plurality of vectors may be derived from prioritizations for improvement of the feature that are manually generated by the owner of the application, the developer of the application, etc. As discussed herein, one or more of the plurality of vectors may be derived from one or more subvectors. In certain embodiments, the priorities assigned to the features of the user applications may be stored by the prioritization engine 120 in the analytics datastore 114.

Certain embodiments of the prioritization system 116 include a user interface engine 122 that may be used to provide feature prioritization information to a user 124 at a user interface 126. In certain embodiments, the user 124 may identify one or more features for which the user 124 desires prioritization information. In certain embodiments, the user interface engine 122 may retrieve feature names and their corresponding prioritization from the analytics datastore 114. In certain embodiments, the feature names and their corresponding prioritization may be displayed in priority for the user 124. Other manners of displaying the prioritizations for various features may be implemented based on the teachings of the present disclosure.

Figure 2:
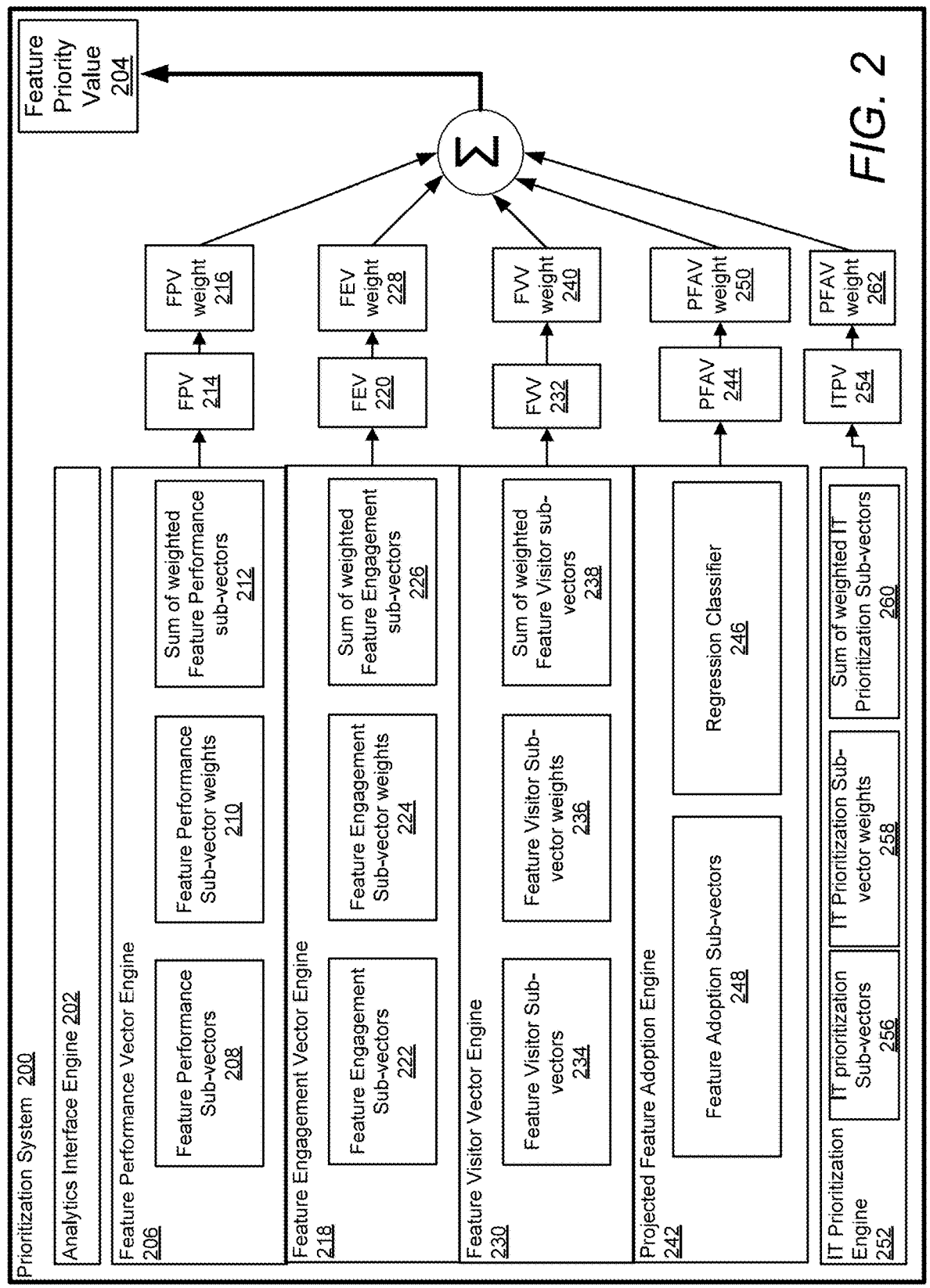
FIG. 2 shows components of a prioritization system that may be used to implement certain embodiments of the disclosed system.

FIG. 2 shows components of a prioritization system 200 that may be used to implement certain embodiments of the disclosed system. In the embodiment shown in FIG. 2, and analytics interface engine 202 is configured to retrieve raw, partially processed, and/or fully processed analytics data from an analytics store or directly from an analytics engine. The data retrieved by the analytics interface engine 202 is used to generate one or more vectors that are employed to generate a weighted sum of vectors to generate a feature priority value 204 for the feature.

In the specific example shown in FIG. 2, a plurality of vectors indicative of user interaction and performance are derived from the data retrieved by the analytics interface engine 202. Here, the prioritization system 200 includes a feature performance vector engine 206 configured to generate a feature performance vector 214 indicative of system performance aspects of the feature, as discussed herein. In this example, the feature performance vector engine 206 generates one or more feature performance sub-vectors 208 from the analytics data relating to the system performance of the feature. Each of the feature performance sub-vectors is assigned a sub-weight at 210 and a weighted sum of the feature performance sub-vectors is generated at 212 to derive the feature performance vector 214, which is assigned a feature performance vector weight 216 for use in generating the weighted sum of vectors for the feature priority value 204.

In the specific example shown in FIG. 2, the prioritization system 200 includes a feature engagement vector engine 218 configured to generate a feature engagement vector 220 indicative of how users engage the feature as discussed herein. In this example, the feature engagement vector engine 218 generates one or more feature performance sub-vectors 222 from the analytics data relating to user engagement with the feature. Each of the feature engagement sub-vectors is assigned a corresponding weight at 224 and a weighted sum of the feature engagement sub-vectors is generated at 226 to derive the feature engagement vector 220, which is assigned a feature engagement vector weight 228 for use in generating the weighted sum of vectors for the feature priority value 204.

The specific example of the prioritization system 200 shown in FIG. 2 also includes a feature visitor vector engine 230 configured to generate a feature visitor vector 232 indicative of the types of users that use the feature as discussed herein. In this example, the feature visitor vector engine 230 generates one or more feature visitor sub-vectors 234 from the analytics data relating to the types of users using the feature. Each of the feature visitor sub-vectors 234 are assigned a corresponding weight at 236, and a weighted sum of the feature engagement sub-vectors is generated at 238 to derive the feature visitor vector 232, which is assigned a feature visitor vector weight 240 for use in generating the weighted sum of vectors for the feature priority value 204.

Certain embodiments of the prioritization system 200 include a projected feature adoption engine 242 that is configured to generate a projected feature adoption vector 244 indicative of whether users will adopt an enhanced and/or improved version of the existing feature based on historical user adoption of similar enhanced and/or improved features. In this regard, the projected feature adoption engine 242 employs a regression classifier 246 that has been trained using historical characteristics of features having similar characteristics to a feature that is being analyzed for prioritization assignment. The projected feature adoption engine 242 extracts characteristics of the feature being analyzed and provides the characteristics as a feature adoption sub-vector 248 to the regression classifier 246. In certain embodiments, the projected feature adoption vector 244 is provided by the regression classifier 246 and is assigned a weight at 250 for use in generating the weighted sum of vectors for the feature priority value 204.

The specific example of the prioritization system 200 shown in FIG. 2 also includes an IT prioritization engine 252 configured to generate an IT prioritization vector 254 indicative of the priorities assigned to an enhancement, improvement, and/or update of a feature as determined by a user, developer, etc. as discussed herein. In this example, the IT prioritization engine 252 generates one or more IT prioritization sub-vectors 256 based on subjective prioritization of the feature enhancement and/or update. Each of the IT prioritization sub-vectors 256 are assigned a corresponding weight at 258 and a weighted sum of the IT prioritization sub-vectors is generated at 260 to derive the IT prioritization vector 224, which is assigned an IT prioritization vector weight 262 for use in generating the weighted sum of vectors for the feature priority value 204.

Figure 3:
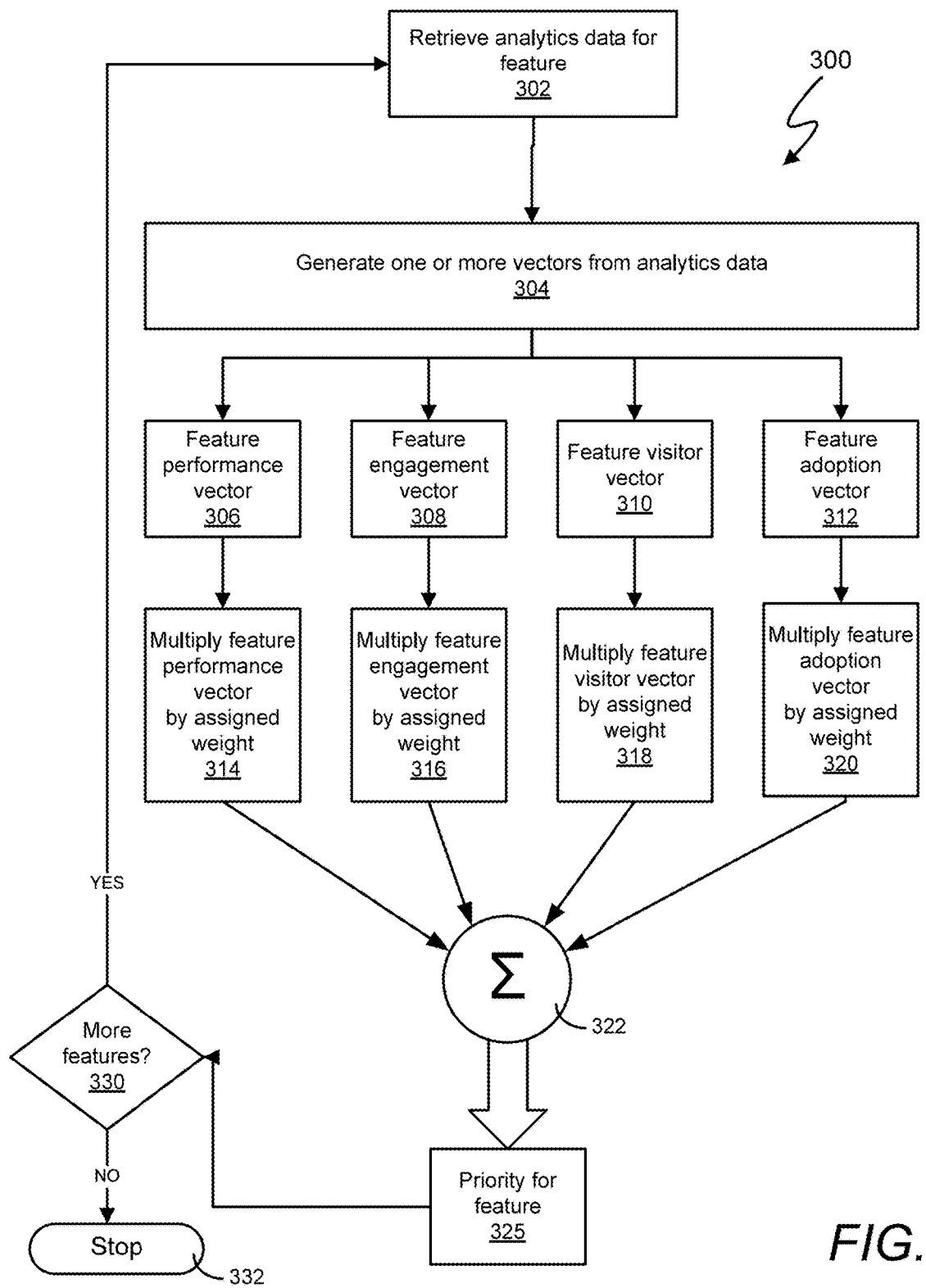
FIG. 3 is a flowchart showing exemplary operations that may be implemented in certain embodiments of the disclosed system.

FIG. 3 is a flowchart 300 showing exemplary operations that may be implemented in certain embodiments of the disclosed system. In this example, analytics data for a feature is retrieved at operation 302. One or more vectors are generated from the analytics data at operation 304. In certain embodiments, a feature performance vector is generated at operation 306, a feature engagement vector is generated at operation 308, a feature visitor vector is generated at operation 310, and a feature adoption vector is generated at 312. Each of the vectors in certain embodiments has a corresponding vector weight indicative of the degree to which the vector affects the value of the feature priority vector. In this example, the feature performance vector is multiplied by its assigned weight at operation 314. The feature engagement vector is multiplied by its assigned weight at operation 316. The feature visitor vector is multiplied by its assigned weight at operation 318. The feature adoption vector is multiplied by its assigned weight at operation 320. The weighted feature performance vector, weighted feature engagement vector, weighted feature visitor vector, and weighted feature adoption vector are summed at operation 320 to generate the priority for the feature enhancement and/or update and/or improvement at operation 325. At operation 330, a determination is made as to whether there are further features that are to be prioritized. If so, the analytics data for a further feature is retrieved at operation 302 and operated upon until a priority for the further feature is provided at operation 325. Once a determination is made that all of the features that are to be subjected to prioritization have been prioritized, prioritization operations may be ended and/or suspended at operation 332.

Figure 4:
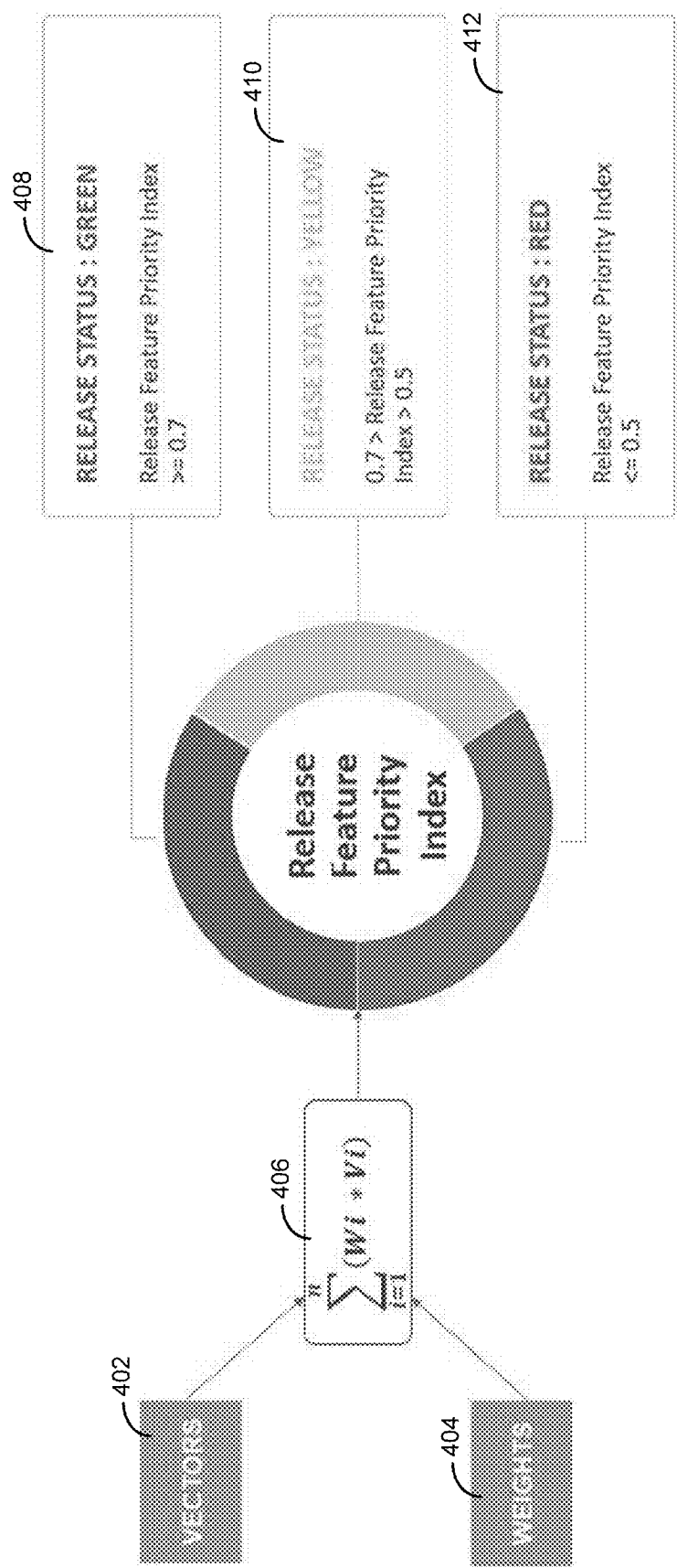
FIG. 4 depicts an example in which the prioritization of a feature is indexed based on a normalized value of the weighted sum of the vectors.

FIG. 4 depicts an example in which the prioritization of a feature is indexed based on a normalized value of the weighted sum of the vectors. In the specific example shown here, the normalized value of the weighted sum is placed in one of three indexed bins. In this example, the vectors 402 and their corresponding weights 404 are subject to a summation operation at 406. The resulting value is indexed into one of three priority index bins. Here, the index bins include a green index bin into which the feature is prioritized when the value of the prioritization is, for example, greater than or equal to 0.7. A prioritization value of between 0.7 and 0.5 places the feature in a yellow index bin 410. A prioritization value less than 0.5 places the feature in a red index bin 412. In certain embodiments, features having a green prioritization index correspond to feature implementations/enhancements/updates that are likely to result in a high level of success in deployment, usefulness, and acceptance of the features. In certain embodiments, features having a yellow prioritization index correspond to feature implementations/enhancements/updates that are likely to result in a moderate level of success in deployment, usefulness, and acceptance of the features. In certain embodiments, features having a red prioritization index correspond to feature improvements, enhancements, and/or updates that are not likely to be useful or accepted if deployed. It will be recognized, in view of the teachings of the present disclosure, that other manners of indexing prioritizations may be used, the foregoing merely being a non-limiting example.

Figure 5:
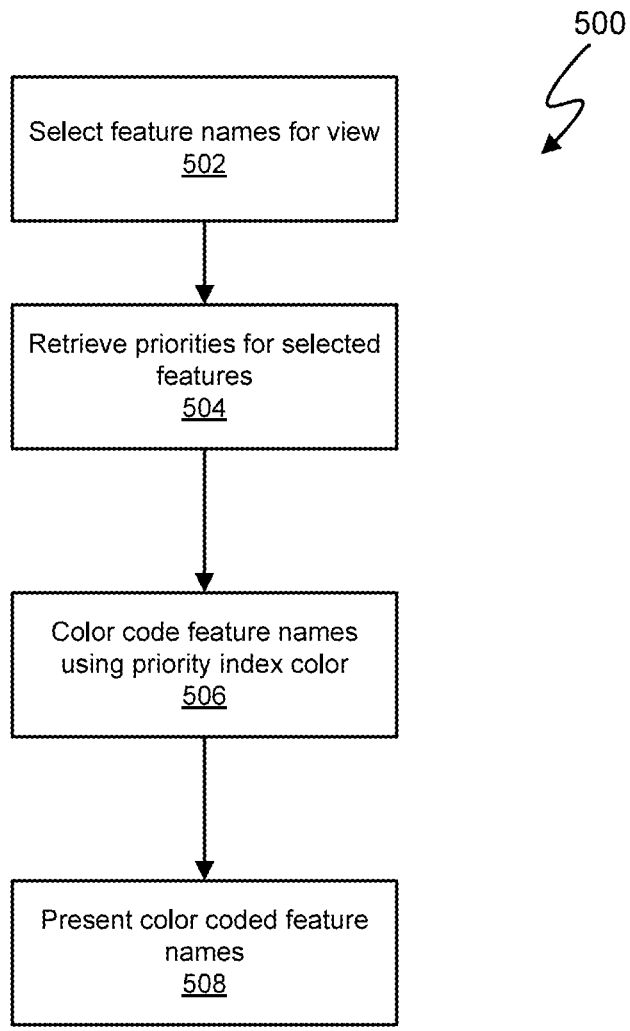
FIG. 5 is a flowchart of exemplary operations that may be used to provide feature prioritizations at a user interface.

FIG. 5 is a flowchart 500 of exemplary operations that may be used to provide feature prioritizations at a user interface. In this example, a developer may select a user application associated with prioritized features. In certain embodiments, all of the features of the user application may be presented to the developer for individual selection. In certain embodiments, a filtered version of the features of the user application may be presented to the developer, where only features having a predetermined priority are presented for developer selection. In certain embodiments, the developer selects the feature names of the features that are to be viewed at operation 502. At operation 504, certain embodiments retrieve the priorities for the selected features. Feature names may be presented to the developer with a visual indication of the corresponding priority and/or priority index for the feature. In one example, the feature names selected at 502 are color-coded using the corresponding priority index color for the feature. In certain embodiments, the color-coded feature names are presented to the developer at operation 508.

Figure 6:
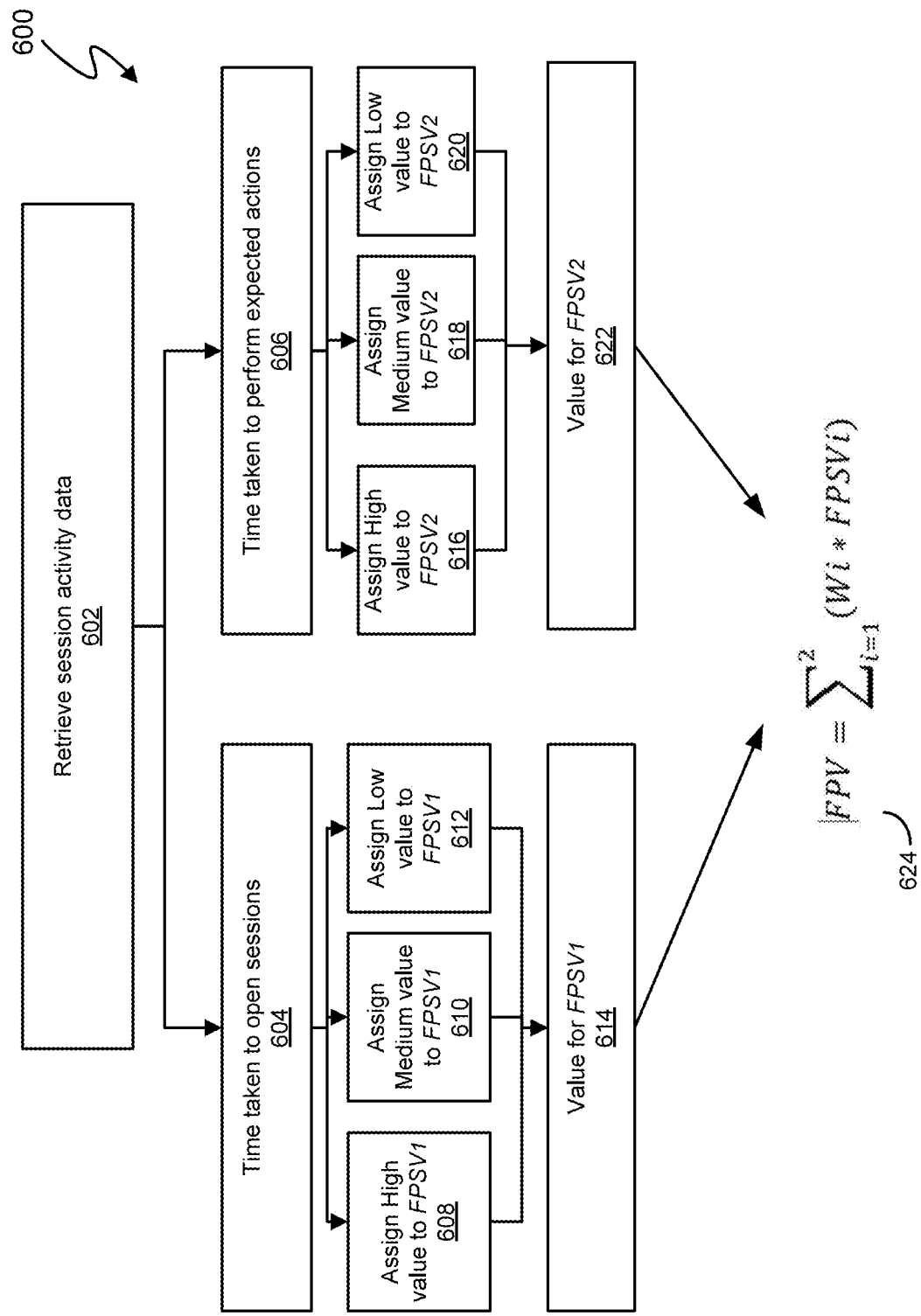
FIG. 6 is a flowchart showing exemplary operations that may be executed to generate a feature performance vector.

FIG. 6 is a flowchart 600 showing exemplary operations that may be executed to generate a feature performance vector FPV. In this example, session activity data is retrieved at operation 602 and used to generate two feature performance sub-vectors $FPSV_1$ and $FPSV_2$. Sub-vector $FPSV_1$ is generated using analytics data relating to the time taken to open sessions in which the features used. Sub-vector $FPSV_2$ is generated using analytics data at operation 606 relating to the time taken to perform expected actions using the feature.

In the specific example shown in FIG. 6, the values for $FPSV_1$ and $FPSV_2$ are assigned a high-value index (e.g., 3), a medium value index (e.g., 2), or a low-value index (e.g., 1). Here, a high index value is assigned to $FPSV_1$ at operation 608 if the data retrieved at operation 604 meets a first set of criteria, a medium index value at operation 610 if the data retrieved at operation 604 meets a second set of criteria, and a low index value at operation 612 if the data retrieved at operation 604 meets a third set of criteria. The resulting index value for $FPSV_1$ is provided at operation 614. As an example, the time taken for opening sessions for a payments page may be assigned a higher importance than the time taken to open a session in which a person subscribes to a newsletter. In such instances, session importance may be based on the financial implications involved. The payments page would be given a high index value whereas the newsletter page would fall in either the second criteria (612) or third criteria (610) depending on the classification.

With respect to $FPSV_2$, a high index value is assigned to $FPSV_2$ at operation 616 if the data retrieved at operation 606 meets a first set of criteria, a medium index value at operation 618 if the data retrieved at operation 606 meets a second set of criteria, and a low index value at operation 620 if the data retrieved at operation 606 meets a third set of criteria. The resulting index value for $FPSV_2$ is provided at operation 622. As an example, the time taken for processing payments on a payment page may be more important than the time taken to load more product images owing to the financial implications involved. In such instances, the processing of payments would be given a high index value, whereas the act of loading more product images would be assigned at operation 612 or at operation 610 depending on the need (prior images loaded, traffic to the site, etc.).

In certain embodiments, each of the sub-vectors $FPSV_1$ and $FPSV_2$ is associated with a corresponding weight $W_i$, the values of which are dependent on the degree to which a given sub-vector is to influence the final value of the feature performance vector FPV. The sum of the weighted feature performance sub-vectors is generated at 624 and used to generate the final value feature performance vector FPV. In certain embodiments, the FPV is used with other vectors to generate the feature priority value for the feature.

Figure 7:
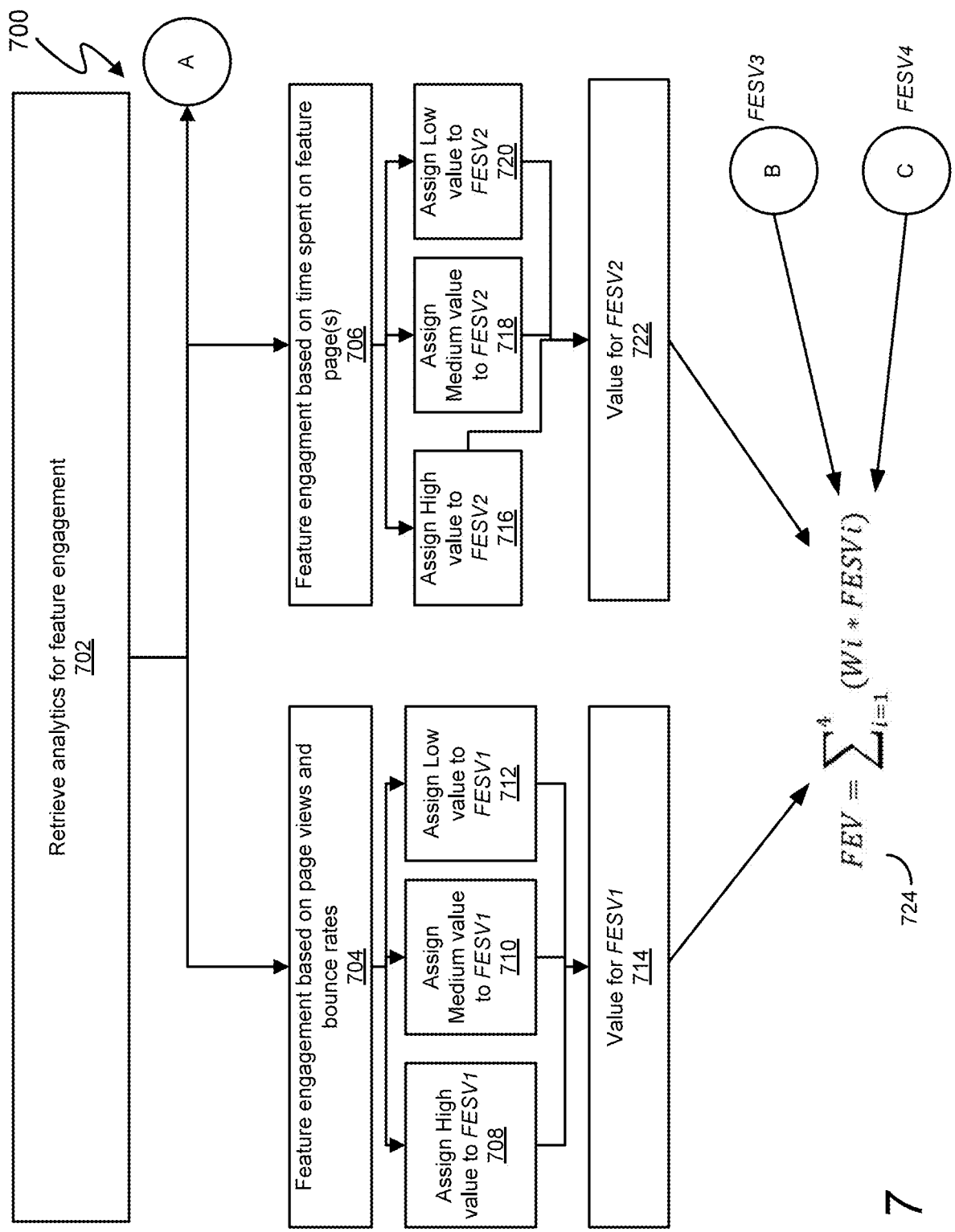
FIG. 7 and FIG. 8 show a flowchart of exemplary operations that may be executed to generate a feature engagement vector.
Figure 8:
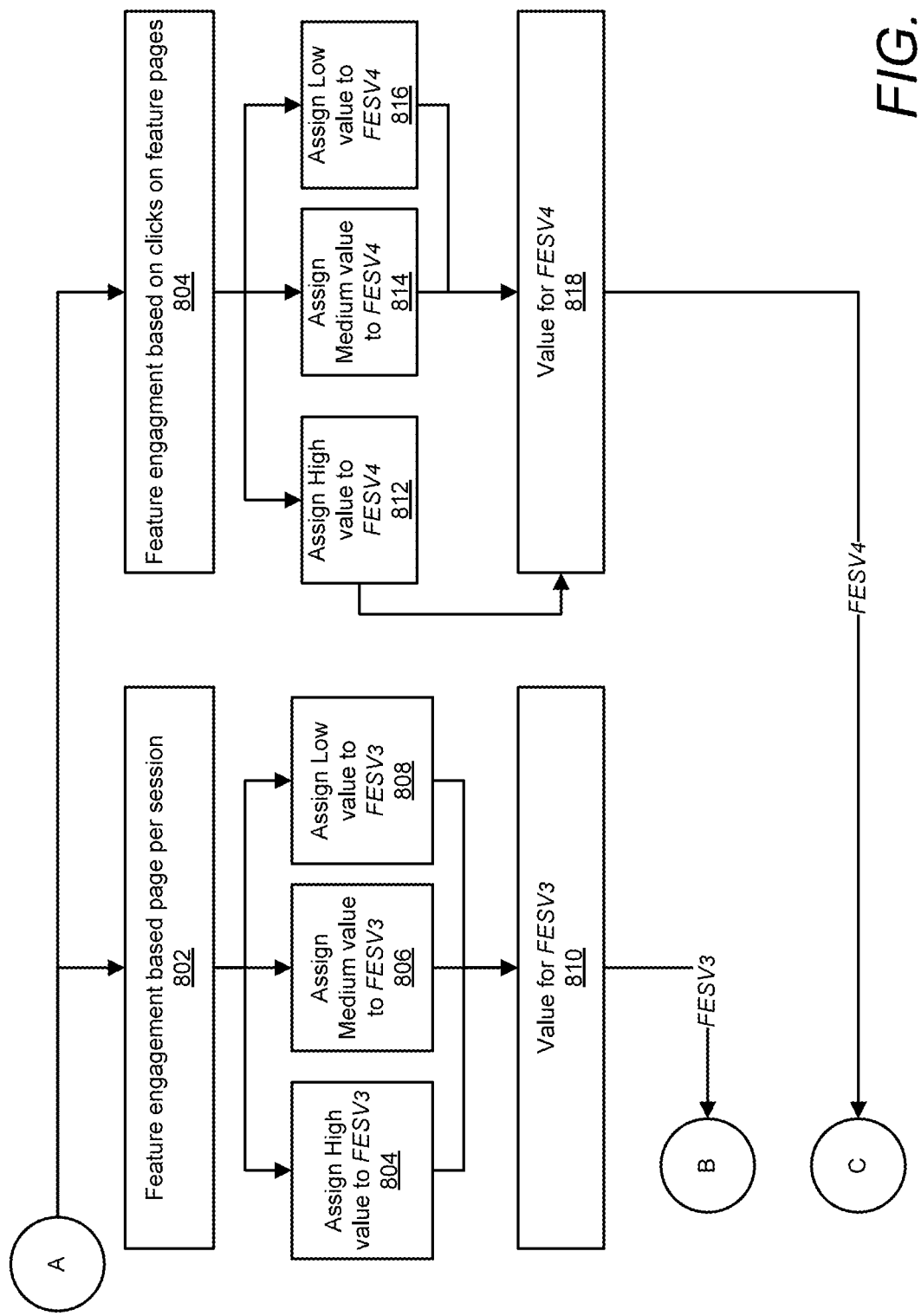

FIG. 7 and FIG. 8 show a flowchart 700 of exemplary operations that may be executed to generate a feature engagement vector FEV. In this example, data relating to the engagement of users with the feature is retrieved at operation 702 and used to generate four feature engagement sub-vectors $FESV_1$, $FESV_2$, $FESV_3$, and $FESV_4$. Feature engagement sub-vector $FESV_1$ is generated at 704 using analytics data relating to page views and bounce rates for feature pages accessed by the users when using the feature. Feature engagement sub-vector $FESV_2$ is generated at operation 706 using analytics data relating to the time spent using the feature by users as measured, for example, by the time users spend on the pages of the feature. Feature engagement sub-vector $FESV_3$ is generated at operation 802 based on the number of times a feature page is accessed during a session in which the feature is used. Sub-vector $FESV_4$ is generated at operation 804 based on clicks on controls of the feature pages.

In the specific example shown in FIG. 7 and FIG. 8, the values $FESV_1$, $FESV_2$, $FESV_3$, and $FESV_4$ are indexed. In one example, $FESV_1$, $FESV_2$, $FESV_3$, and $FESV_4$ are each assigned to one of three index values. In certain embodiments, the index values may include a high-value index (e.g., 3), a medium value index (e.g., 2), and a low-value index (e.g., 1). Here, a high index value is assigned to $FESV_1$ at operation 708 if the data retrieved at operation 702 meets a first set of criteria, a medium index value at operation 710 if the data retrieved at operation 702 meets a second set of criteria, and a low index value at operation 712 if the data retrieved at operation 702 meets a third set of criteria. The resulting value for $FESV_1$ is provided at operation 714. For example, feature engagement on a checkout call to action in a product page may be assigned at operation 708, whereas engagement with a similar product call to action on the same product page may be assigned at operation 710 or operation 712.

With respect to $FESV_2$, a high index value is assigned to $FESV_2$ at operation 716 if the data retrieved at operation 702 meets a first set of criteria, a medium index value at operation 718 if the data retrieved at operation 702 meets a second set of criteria, and a low index value at operation 720 if the data retrieved at operation 702 meets a third set of criteria. The resulting value for $FESV_2$ is provided at operation 722. As an example, time spent on a product page may be assigned at operation 716, whereas time spent reading or subscribing to a newsletter page would fall under index values assigned at operation 718 or operation 720. The sub-vector itself might occupy low priority and may be given a vector classification of 2 or 3.

With respect to $FESV_3$, a high index value is assigned to $FESV_3$ at operation 804 if the data retrieved at operation 702 meets a first set of criteria, a medium index value at operation 806 if the data retrieved at operation 702 meets a second set of criteria, and a low index value at operation 808 if the data retrieved at operation 702 meets a third set of criteria. The resulting value for $FESV_3$ is provided at operation 810. As an example, the number of pages browsed in a product category in a session may be assigned in index value at operation 804, whereas the number of pages opened under support operations might be used to assign an index value at operation 806 or operation 808. To further this example, it may be desirable for a customer to browse more product options but to find information to contact the company very easily without having to hop between pages. The sub-vector itself might occupy low priority and may be given a vector classification of 2 or 3.

With respect to $FESV_4$, a high index value is assigned to $FESV_4$ at operation 812 if the data retrieved at operation 702 meets a first set of criteria, a medium index value at operation 814 if the data retrieved at operation 702 meets a second set of criteria, and a low index value at operation 816 if the data retrieved at operation 702 meets a third set of criteria. The resulting value for $FESV_4$ is provided at operation 818. As in example, if a page has eight clickable calls to action, a determination may be made as to how many of the clickable calls to action are actually collected by the users. In such instances, the values may be assigned based on desired behavior. For example, it may be desirable to have the user engage a payments page rather than having more engagement with a call to action on the home page. Based on this desirability, the index values may be assigned.

Each of the feature engagement sub-vectors $FESV_1$, $FESV_2$, $FESV_3$, and $FESV_4$ are assigned a corresponding weight $W_i$, the values of which are dependent on the degree to which a given feature engagement sub-vector is to influence the final value of the feature engagement vector FEV. A weighted sum of the feature engagement sub-vectors $FESV_1$, $FESV_2$, $FESV_3$, and $FESV_4$ is generated at operation 724 to arrive at the final value for the feature engagement vector FEV.

Figure 9:
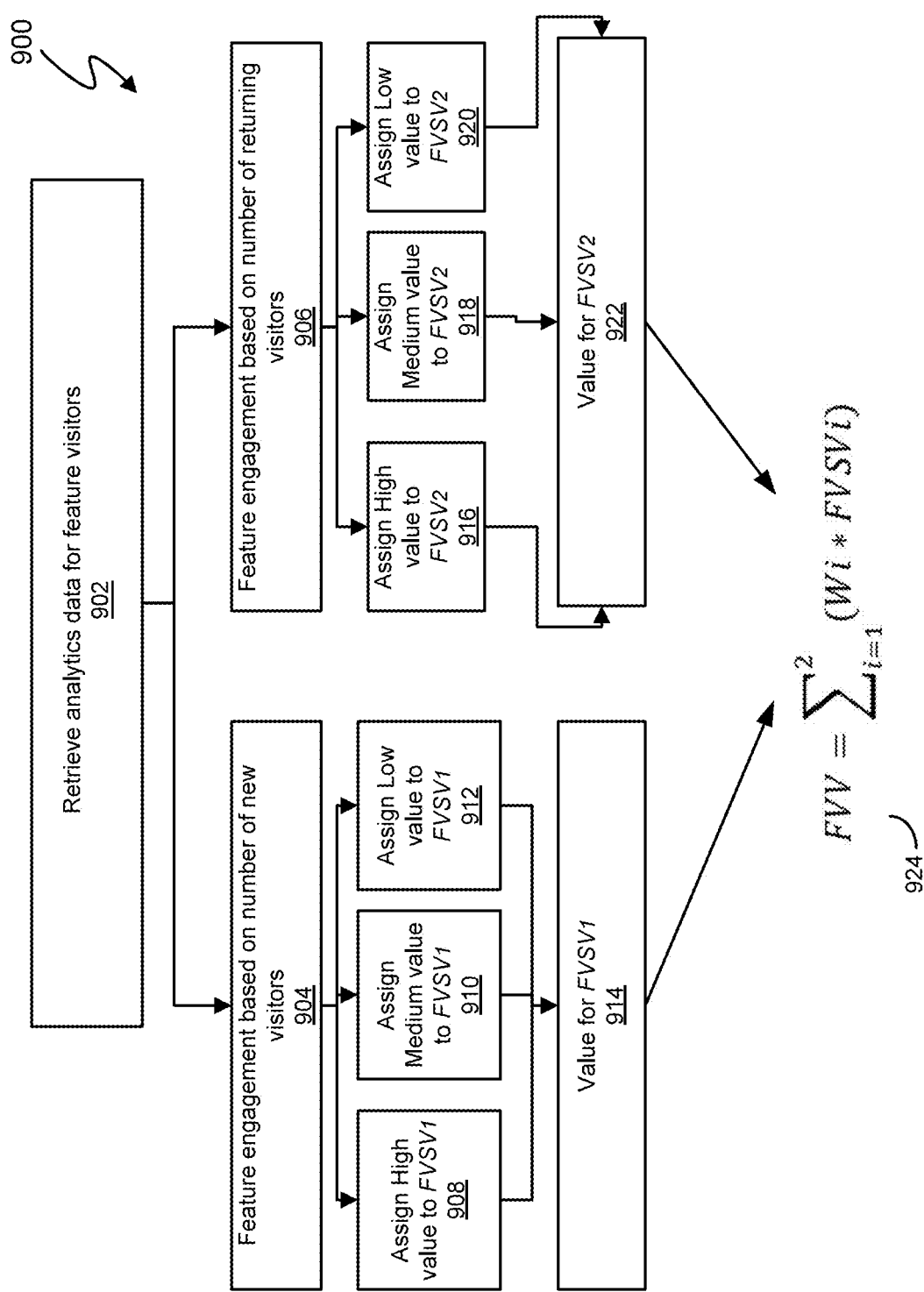
FIG. 9 is a flowchart showing exemplary operations that may be executed to generate a feature visitor vector.

FIG. 9 is a flowchart 900 showing exemplary operations that may be executed to generate a feature visitor vector FVV. In this example, data relating to the types of users that access the feature is retrieved at operation 902 and used to generate two feature visitor sub-vectors $FVSV_1$ and $FVSV_2$. Visitor feature sub-vector $FVSV_1$ is generated at operation 904 using analytics data relating to the engagement of new users with the feature. Visitor sub-vector $FVSV_2$ is generated at operation 906 using analytics data relating to the number of visitors returning to use the feature.

In the specific example shown in FIG. 9, the values for $FVSV_1$ and $FVSV_2$ are assigned a high-value index (e.g., 3), a medium value index (e.g., 2), or a low-value index (e.g., 1). Here, a high index value is assigned to $FVSV_1$ at operation 908 if the data retrieved at operation 904 meets a first set of criteria, a medium index value at operation 910 if the data retrieved at operation 904 meets a second set of criteria, and a low index value at operation 912 if the data retrieved at operation 904 meets a third set of criteria. The resulting index value for $FVSV_1$ is provided at operation 914. As an example, new visitors to product pages in a site would be assigned an index at operation 908, the pertinent criteria being attracting more new users for revenue conversion. To further this example, new users engaging support pages may be assigned an index at operation 912 as it may be desirable to have the least number of users seeking product support.

With respect to $FVSV_2$, a high index value is assigned to $FVSV_2$ at operation 916 if the data retrieved at operation in 906 meets a first set of criteria, a medium index value at operation 918 if the data retrieved at operation 906 meets a second set of criteria, and a low index value at operation in 920 if the data retrieved at operation number 906 meets a third set of criteria. The resulting index value for $FVSV_2$ is provided at operation 922. For example, it may be desirable for returning visitors to always checkout a deals carousel and hence the index value would be assigned at operation 916. However, actions where returning users keep on subscribing to newsletters might be assigned at operation 922.

In certain embodiments, each of the feature visitor sub-vectors $FVSV_1$ and $FVSV_2$ are associated with a corresponding weight $W_i$, the values of which are dependent on the degree to which a given feature visitor sub-vector is to influence the final value of the feature visitor vector FVV. The sum of the weighted feature visitor sub-vectors is generated at 924 and used to generate the final value feature visitor vector FVV. In certain embodiments, the FVV is used with other vectors to generate the feature priority value for the feature.

Figure 10:
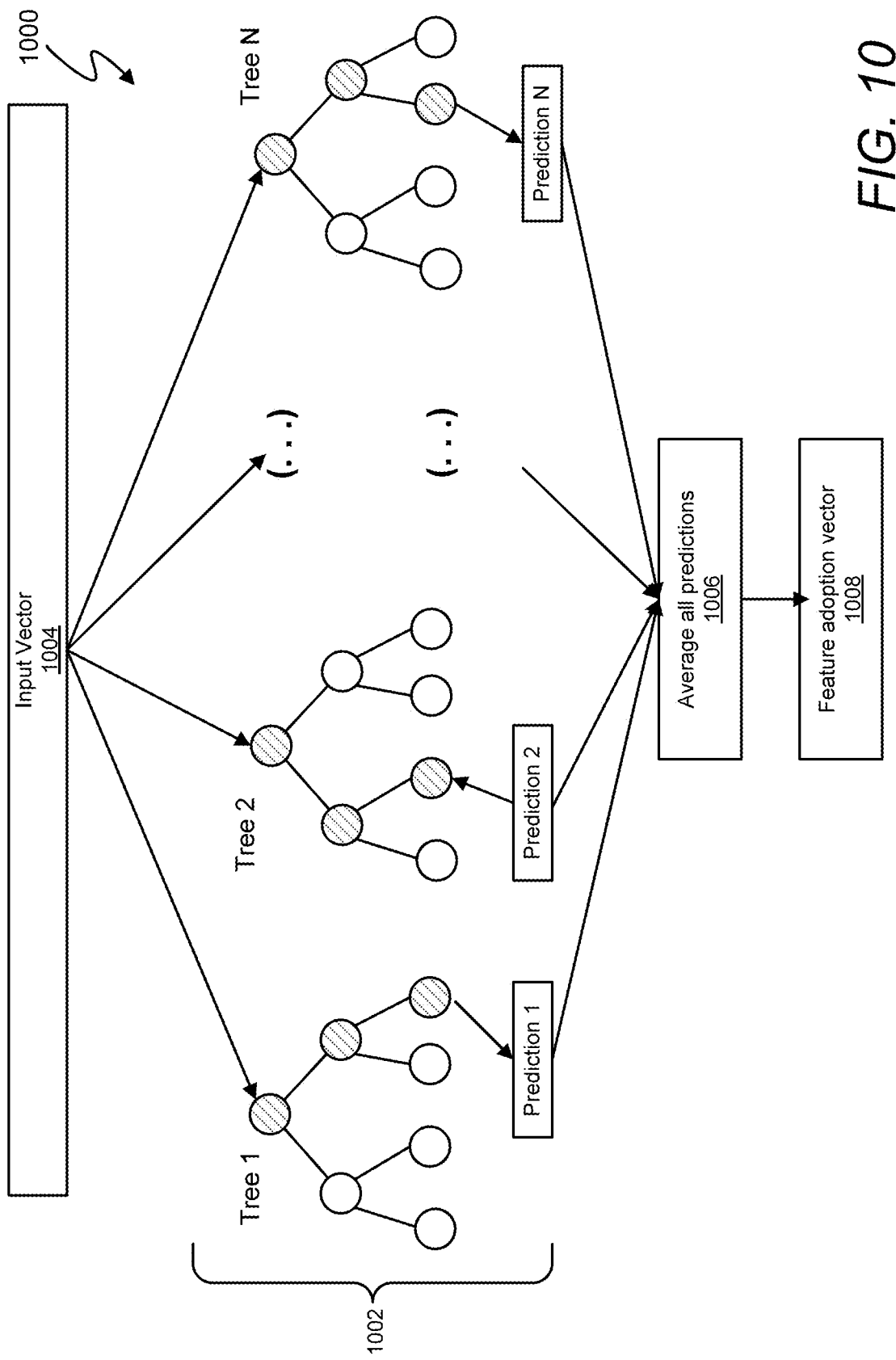
FIG. 10 depicts a regression classification model 1000 that may be used to generate a feature adoption vector.

FIG. 10 depicts a regression classification model 1000 that may be used to generate a feature adoption vector FAV in certain embodiments of the disclosed system. The specific embodiments shown in FIG. 10 includes a random forest model 1002 that has been trained on various feature characteristics to predict the likelihood that a feature having similar feature characteristics (e.g., operating the in the same context) will be adopted by users. In this example, the random forest model 1002 includes a plurality of decision trees Tree 1 through Tree N, where N is an index corresponding to the number of trees used in the model. The decision trees Tree 1 through Tree N are configured to receive an input vector 1004. The input vector 1004 corresponds to the feature characteristics of the feature that is being prioritized. Each of the decision trees Tree 1 through Tree N use one or more dimensions of the input vector 1004 to generate a corresponding prediction value Prediction 1 through Prediction N. The prediction values Prediction 1 through Prediction N may be averaged in certain embodiments at operation 1006 to provide the feature adoption vector FAV at operation 1008. The value of the feature adoption vector FAV is indicative of the likelihood that users will adopt enhancements and/or improvements of the feature being prioritized. In certain embodiments, the value of the feature adoption vector FAV is used with other vectors to generate the feature priority vector FPV.

Figure 11:
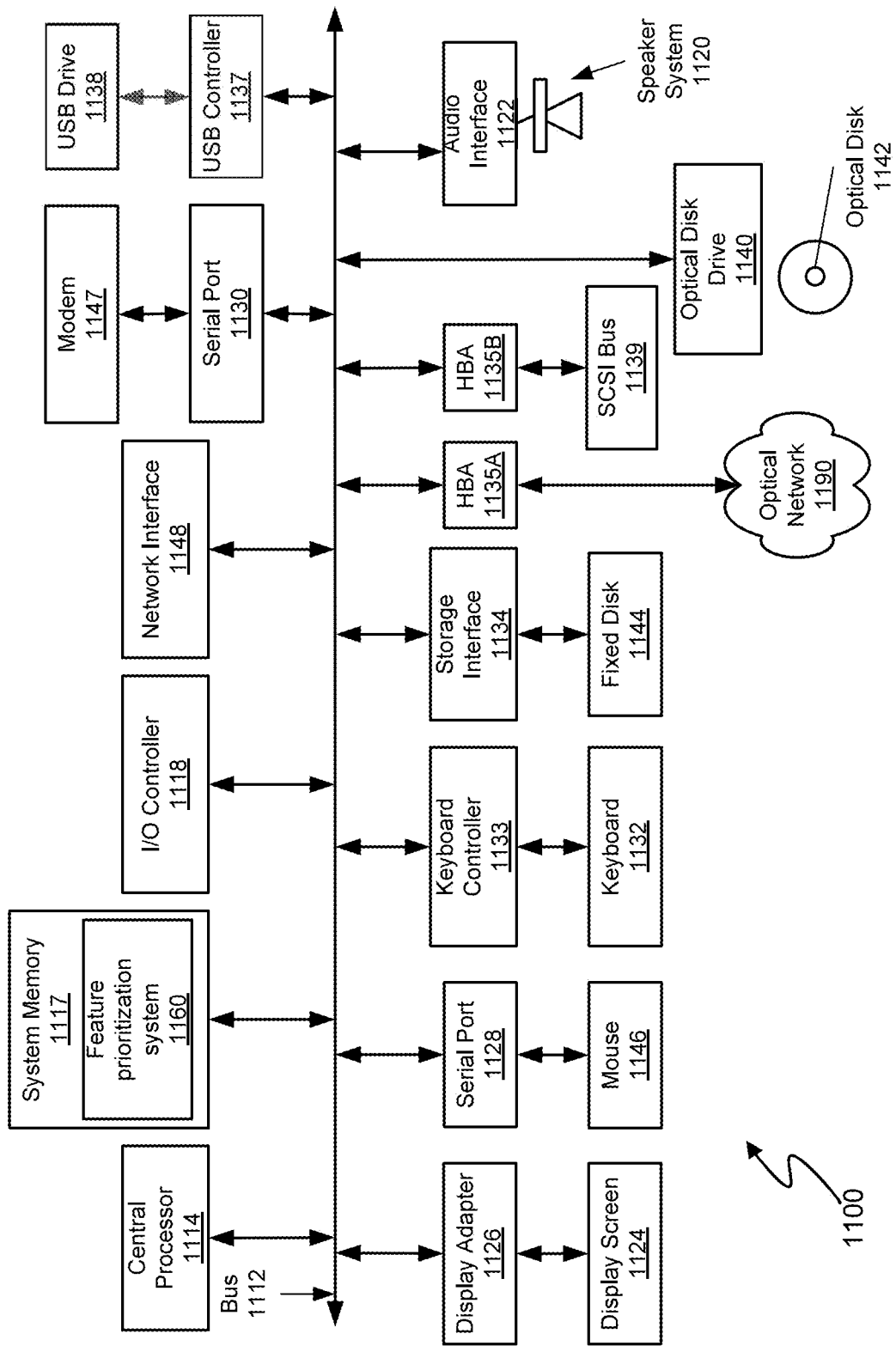
FIG. 11 depicts a block diagram of a computer system suitable for implementing aspects of the systems described herein.

FIG. 11 depicts a block diagram of a computer system 1100 suitable for implementing aspects of the systems described herein, and so can be viewed as an example of a computing device supporting a feature prioritization system 1160. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with an optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1028), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1037, or other local or remote computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 is readily known in the art and is not discussed in detail in this application. Code to implement portions of the systems described herein can be stored in computer-readable storage media such as one or more of system memory 1117, fixed disk 1144, optical disk 1142, or floppy disk. The operating system provided on computer system 1110 may be WINDOWS, UNIX, LINUX, IOS, or other operating system. To this end, system memory 1117 is depicted in FIG. 11 as storing code implementing a feature prioritization system 1160 in the manner discussed herein.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for prioritizing enhancement and/or improvements of features of a user application, comprising:
    monitoring, by an analytics engine, analytics data comprising at least one of performance of a feature and user interactions with a feature of the user application;
    storing, by the analytics engine, the analytics data in an analytics datastore;
    retrieving, by an analytics interface engine, the analytics data from the analytics datastore;
    providing, by the analytics interface engine to a prioritization engine, the analytics data, wherein the prioritization engine generates a plurality of vectors using the analytics data, wherein the plurality of vectors include vectors corresponding to one or more of:
        a feature performance vector based on performance metrics of the feature of the user application;
        a feature engagement vector based on metrics for user engagement with the feature of the user application;
        a feature visitor vector based on metrics associated with new visitors and/or returning visitors using the feature of the user application; and
        a feature adoption vector based on user adoption of prior features, wherein the feature adoption vector is generated using a regression classification model trained using historical characteristics of features having similar characteristics to the feature that is being analyzed for prioritization assignment;
    assigning a weight to each of the plurality of vectors;
    assigning a priority to enhancing and/or improving the feature of the user application based on a weighted sum of the plurality of vectors; and
    providing, by a user interface engine, feature prioritization information to a user interface, wherein a prioritization system comprises the analytics interface engine, the prioritization engine, and the user interface engine.

2. The computer-implemented method of claim 1, wherein the weighted sum of the plurality of vectors is used to generate an index value corresponding to the priority for enhancing and/or improving the feature.

3. The computer-implemented method of claim 1, wherein one or more of the feature performance vector, the feature engagement vector, and the feature adoption vector are generated from a corresponding plurality of sub-vectors.

4. The computer-implemented method of claim 1, wherein the plurality of vectors include a feature performance vector based on one or more feature performance sub-vectors, wherein the one or more sub-vectors of the feature performance vector include:
   a sub-vector corresponding to the time taken for opening sessions associated with the feature;
   a sub-vector corresponding to the time taken for performing actions associated with the feature; and
   wherein the feature performance vector is determined as a weighted sum of the one or more feature performance sub-vectors.

5. The computer-implemented method of claim 1, wherein the plurality of vectors include a feature engagement vector based on one or more feature engagement sub-vectors, wherein the one or more feature engagement sub-vectors include:
   a sub-vector corresponding to the number of clicks that users have made while engaging with the feature;
   a sub-vector corresponding to the time that the users have spent using the feature;
   a sub-vector corresponding to the bounce rates for pages viewed by users engaging the feature; and
   a sub-vector corresponding to the number of pages viewed by users during a session; and
   wherein the feature engagement vector is determined as a weighted sum of the one or more feature engagement sub-vectors.

6. The computer-implemented method of claim 1, wherein the plurality of vectors include a feature adoption vector, wherein the feature adoption vector corresponds to the user adoption of prior features operating in a same context as the feature.

7. The computer-implemented method of claim 6, wherein the feature adoption vector is derived from a regression analysis of one or more of:
   ratings of the prior features given by users of the prior features; and
   ratings given to the prior features by owners of products including the prior features.

8. A system comprising:
   one or more information handling systems, wherein the one or more information handling systems include:
   a processor;
   a data bus coupled to the processor; and
   a non-transitory, computer-readable storage medium embodying computer program code, the non-transitory, computer-readable storage medium being coupled to the data bus;
   wherein the computer program code included in one or more of the information handling systems is executable by the processor of the information handling system so that the information handling system, alone or in combination with other information handling systems, executes operations comprising:
   monitoring, by an analytics engine, analytics data comprising at least one of performance of a feature and user interactions with a feature of a user application;
   storing, by the analytics engine, the analytics data in an analytics datastore;
   retrieving, by an analytics interface engine, the analytics data from the analytics datastore;
   providing, by the analytics interface engine to a prioritization engine, the analytics data, wherein the prioritization engine generates a plurality of vectors using the analytics data, wherein the plurality of vectors include vectors corresponding to one or more of:
      a feature performance vector based on performance metrics of the feature of the user application;
      a feature engagement vector based on metrics for user engagement with the feature of the user application;
      a feature visitor vector based on metrics associated with new visitors and/or returning visitors using the feature of the user application; and
      a feature adoption vector based on user adoption of prior features, wherein the feature adoption vector is generated using a regression classification model trained using historical characteristics of features having similar characteristics to the feature that is being analyzed for prioritization assignment;
   assigning a weight to each of the plurality of vectors;
   assigning a priority to enhancing and/or improving the feature of the user application based on a weighted sum of the plurality of vectors; and
   providing, by a user interface engine, feature prioritization information to a user interface, wherein a prioritization system comprises the analytics interface engine, the prioritization engine, and the user interface engine.

9. The system of claim 8, wherein the weighted sum of the plurality of vectors is used to generate an index value corresponding to the priority for enhancing and/or improving the feature.

10. The system of claim 8, wherein one or more of the feature performance vector, the feature engagement vector, and the feature adoption vector are generated from a corresponding plurality of sub-vectors.

11. The system of claim 8, wherein the plurality of vectors include a feature performance vector based on one or more feature performance sub-vectors, wherein the one or more sub-vectors of the feature performance vector include:
   a sub-vector corresponding to the time taken for opening sessions associated with the feature;
   a sub-vector corresponding to the time taken for performing actions associated with the feature; and
   wherein the feature performance vector is determined as a weighted sum of the one or more feature performance sub-vectors.

12. The system of claim 8, wherein the plurality of vectors include a feature engagement vector based on one or more feature engagement sub-vectors, wherein the one or more feature engagement sub-vectors include:
   a sub-vector corresponding to the number of clicks that users have made while engaging with the feature;
   a sub-vector corresponding to the time that the users have spent using the feature;
   a sub-vector corresponding to the bounce rates for pages viewed by users engaging the feature; and
   a sub-vector corresponding to the number of pages viewed by users during a session; and wherein the feature engagement vector is determined as a weighted sum of the one or more feature engagement sub-vectors.

13. The system of claim 8, wherein the plurality of vectors include a feature adoption vector, wherein the feature adoption vector corresponds to the user adoption of prior features operating in the same context as the feature.

14. The system of claim 13, wherein the feature adoption vector is derived from a regression analysis of one or more of:
   ratings of the prior features given by users of the prior features; and
   ratings given to the prior features by owners of products including the prior features.

15. A non-transitory, computer-readable storage medium embodying computer program code, the computer program code comprising computer-executable instructions configured for:
   monitoring, by an analytics engine, analytics data comprising at least one of performance of a feature and user interactions with a feature of a user application;
   storing, by the analytics engine, the analytics data in an analytics datastore;
   retrieving, by an analytics interface engine, the analytics data from the analytics datastore;
   providing, by the analytics interface engine to a prioritization engine, the analytics data, wherein the prioritization engine generates a plurality of vectors using the analytics data, wherein the plurality of vectors include vectors corresponding to one or more of:
      a feature performance vector based on performance metrics of the feature of the user application;
      a feature engagement vector based on metrics for user engagement with the feature of the user application;
      a feature visitor vector based on metrics associated with new visitors and/or returning visitors using the feature of the user application; and
      a feature adoption vector based on user adoption of prior features, wherein the feature adoption vector is generated using a regression classification model trained using historical characteristics of features having similar characteristics to the feature that is being analyzed for prioritization assignment;
   assigning a weight to each of the plurality of vectors;
   assigning a priority to enhancing and/or improving the feature of the user application based on a weighted sum of the plurality of vectors; and
   providing, by a user interface engine, feature prioritization information to a user interface, wherein a prioritization system comprises the analytics interface engine, the prioritization engine, and the user interface engine.

16. The non-transitory, computer-readable storage medium of claim 15, wherein the weighted sum of the plurality of vectors is used to generate an index value corresponding to the priority for enhancing and/or improving the feature.

17. The non-transitory, computer-readable storage medium of claim 15, wherein one or more of the feature performance vector, the feature engagement vector, and the feature adoption vector are generated from a corresponding plurality of sub-vectors.

18. The non-transitory, computer-readable storage medium of claim 15, wherein the plurality of vectors include a feature performance vector based on one or more feature performance sub-vectors, wherein the one or more sub-vectors of the feature performance vector include:
   a sub-vector corresponding to the time taken for opening sessions associated with the feature;
   a sub-vector corresponding to the time taken for performing actions associated with the feature; and
   wherein the feature performance vector is determined as a weighted sum of the one or more feature performance sub-vectors.

19. The non-transitory, computer-readable storage medium of claim 15, wherein the plurality of vectors include a feature engagement vector based on one or more feature engagement sub-vectors, wherein the one or more feature engagement sub-vectors include:
   a sub-vector corresponding to the number of clicks that users have made while engaging with the feature;
   a sub-vector corresponding to the time that the users have spent using the feature;
   a sub-vector corresponding to the bounce rates for pages viewed by users engaging the feature; and
   a sub-vector corresponding to the number of pages viewed by users during a session; and
      wherein the feature engagement vector is determined as a weighted sum of the one or more feature engagement sub-vectors.

20. The non-transitory, computer-readable storage medium of claim 15, wherein the plurality of vectors include a feature adoption vector, wherein the feature adoption vector corresponds to the user adoption of price features operating in the same context as the feature.

* * * * *